United States Patent [19]

Zahn et al.

[11] 3,829,214

[45] Aug. 13, 1974

[54] PHOTOGRAPHIC FILM COPYING APPARATUS

[75] Inventors: Wolfgang Zahn; Volker Weinert, both of Muenchen; Hans Thiene, Unterhaching; Friedrich Hujer, Grunwald, all of Germany

[73] Assignee: Agfa-Gevaert Aktiengesellschaft, Leverkusen, Germany

[22] Filed: July 13, 1973

[21] Appl. No.: 379,111

[30] Foreign Application Priority Data

July 15, 1972  Germany............................ 2234895

[52] U.S. Cl.......................... 355/83, 355/38, 355/73
[51] Int. Cl. ............................................. G03b 27/78
[58] Field of Search............. 355/83, 67, 68, 69, 35, 355/38

[56] References Cited
UNITED STATES PATENTS
2,851,676  9/1958  Woodcock et al.................. 340/174
3,168,860  2/1965  Clerk et al............................ 355/83
3,519,347  7/1970  Bowker et al...................... 355/68 X
3,716,299  2/1973  Balini................................... 355/83

*Primary Examiner*—Richard Moses
*Attorney, Agent, or Firm*—Michael S. Striker

[57]  ABSTRACT

Film being transported along a predetermined path has marks indicating the position of each original. A plurality of originals is viewed in an inspection station positioned immediately prior to a reproducing station. A number of counters, at least equal in number to the number of originals in the inspection station, each furnishes a signal indicating the position of the corresponding original relative to the reproducing station. Associated with each counter is a storage for storing correction values for the original. The correction values are entered by the operator into the storage after viewing of the original in the inspection station. The original the corresponding storage means of which are connected to the input for receiving the correction signals is indicated by indicator lamps positioned along the path of the film within the inspection station. When the associated counter furnishes a signal signifying that the original has arrived at the reproducing station, the value stored in the corresponding storage is transferred to the automatic exposure control, thereby controlling the exposure of the associated original.

12 Claims, 4 Drawing Figures

PHOTOGRAPHIC FILM COPYING APPARATUS

BACKGROUND OF THE INVENTION

The present invention relates to photographic printing apparatus. More specifically it relates to such printing apparatus having roll film and having a transport means for transporting the film along a predetermined path. The film has marks indicating the position of each original along the length of the film. Further, in apparatus of this kind, an inspection station has room for a plurality of originals. Correction means are provided whereby an operator, following inspection of an original, can enter corresponding correction signals into a storage for future use in the automatic exposure control arrangement associated with the reproducing (printing) station.

In known equipment of the above-described type, a plurality of originals (always the same number of originals) is introduced into the inspection station and correction values are affixed thereto when required. The same number of originals then is introduced gradually into a storage and are printed individually. It should be noted that the rolls of films which are being processed in these arrangements comprise a plurality of film strips which have been glued together. The above-described conventional equipment operates correctly only when the distance between originals is the same even when a glued stip gluing two of the above-mentioned film strips together occurs between two adjacent originals. Further, the equipment does not operate correctly if the camera in which the originals were taken does not have a substantially equal distance between sequential originals. The requirement of a substantially constant distance between sequential originals greatly limits the applicability of the above-mentioned automatic printing equipment.

SUMMARY OF THE INVENTION

It is an object of the present invention to furnish a photographic printing arrangement in which the originals need not necessarily occur at substantially equal distances from each other.

The present invention is an automatic printer for printing originals on a roll of photographic film. It comprises transport means for transporting said film along a predetermined path. A reproducing station (printing station) is positioned along said path for reproducing an original located in a predetermined position within said reproducing station. The reproducing station has automatic exposure control means for controlling the exposure of said original in correspondence to a correction signal applied to said exposure control means. Further, an inspection station is positioned prior to said reproducing station along said predetermined path for allowing inspection of a plurality of said originals. Further furnished is a plurality of means, at least equal in number to said plurality of originals in said inspection station, for furnishing distance signals, each signifying the distance of a corresponding one of said plurality of originals in said inspection station from said predetermined position in said reproducing station. Means for stopping said transport means in response to any one of said distance signals signifying a zero distance, that is a distance signifying that the corresponding original is in said predetermined position in said reproducing station, are also provided. A plurality of control storage means each associated with one of said means for furnishing a distance signal is provided, each of said control storage means having an input for receiving a correction signal and an output for furnishing said correction signal. First connecting means are furnished for connecting each of said inputs of said storage means to said correction means in a first predetermined order, each only after furnishing of a correction signal to the last preceding one of said inputs in said first predetermined order, and indicating means for furnishing an indication which of said originals in said inspection station corresponds to the storage means having an input connected to said correction means. Finally, second connecting means are furnished for connecting the output of each of said storage means to said automatic exposure control means when the associated means for furnishing a distant signal furnish said zero distance signal. Further, the printing process is initiated when the correction signals have been transferred from the storage means to the automatic exposure control means.

The first predetermined order is such that the storage means associated with the original closest to the reproducing station has its input connected to the correction means first, each of the subsequent storage means corresponding to originals closest to the reproducing station but still in need of a correction value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
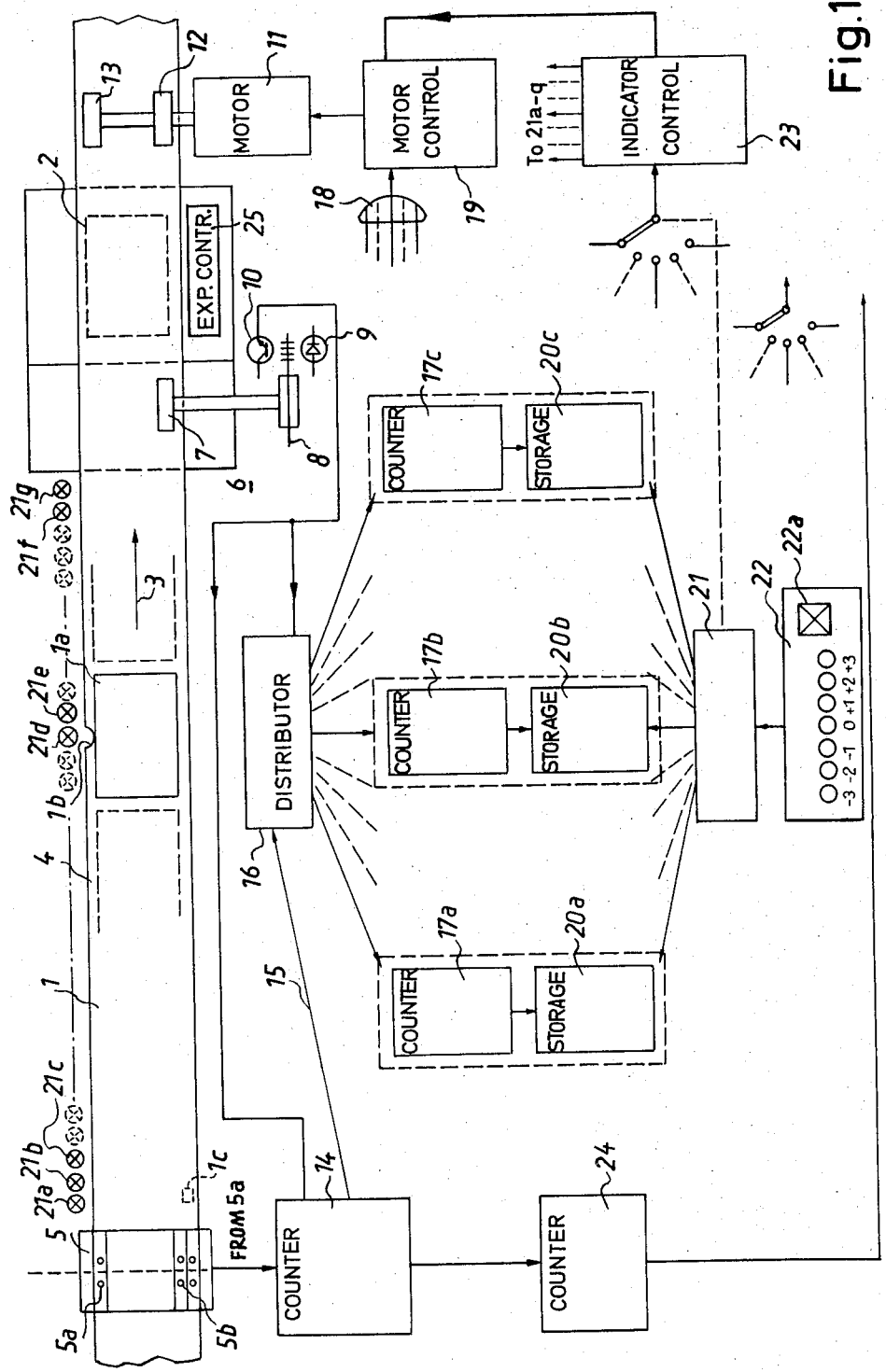
FIG. 1 shows an overall block diagram of the apparatus in accordance with the present invention.

DESCRIPTION OF THE PREFERRED EMBODIMENTS:

A preferred embodiment of the present invention will now be described with reference to the drawing.

Shown in FIG. 1 is a film strip 1, on which originals (1a) are located at what may be arbitrary distances from each other. In the center of each original along the lengthwise edge of said original, an indentation 1b at the edge of the film allows an exact centering of the original in the printing window 2 of the reproducing station. When the original is correctly positioned within the window, the original is said to be in the predetermined position within the reproducing station. The direction of transport of the film is indicated by the arrow 3. Immediately prior to the reproducing station is an inspection station 4, whose length corresponds to an integral multiple of the length of one of the originals 1a. Sensing means 5 sense the indentations 1b (herein referred to as marks) and furnish corresponding mark signals. The sensing means may for example be photoelectric sensing means such as described in the German Offenlegungsschrift 2 048 414 which operate on the basis of reflected light. Specifically, two such arrangements are present, the first, 5a, for sensing the above-mentioned indentations and the second for sensing perforations 1c. The latter are labelled 5b in the drawing.

Shortly prior to the reproducing station are positioned length measuring means indicated by reference numeral 6. These comprise a friction wheel 7 which is rotatably mounted and positioned in contact with the film. The wheel has a low moment of inertia. A disk 8 having a plurality of openings is coupled with the friction wheel. The openings are scanned by means of photoelectric transmitting and receiving means comprising, respectively, an emitting diode 9 and a phototransistor 10. Each time one of the openings passes between the diode 9 and photoresistor 10, a pulse, herein referred to as a distance pulse is created in the emitter-collector circuit of transistor 10. A motor 11, in conjunction with transport rollers 12 and 13 transports the next original to the window 2, following completion of the printing process of any one original.

A counter 14 is connected to the scanning means 5 and to transistor 10 in such a manner that the pulses furnished by transistor 10 are counted on counter 14 following an enabling signal to counter 14 which results from the scanning of one of the marks 1a by the scanning means 5a. The counter, herein referred to as initial counting means, has a capacity which may be adjusted to any desired number within the number of distance pulses which correspond to the length of one of the originals. When counter 14 overflows, it furnishes a signal to distributor means 16. It is the function of the distributor means, which is shown in greater detail in FIG. 2, to enable, in a first predetermined order, each of the counters 17a, 17b, 17c, etc. All these counters are constructed identically and have the same capacity. The capacity of each of these counters is such that, together with the count on counter 14, a number of distance pulses can be counted which corresponds to the distance between the scanning means, 5a, and the reproducing station, window 2. The pulses from transistor 10 are applied to each of counters 17 and are counted by each counter after the enabling of the respective counter as will be discussed with reference to FIG. 2. When any of the counters 17a, b, c, etc. overflows, it furnishes, through OR-gate 18, a signal to motor control circuit 19 for stopping motor 11. Counter 17 can of course be replaced by other types of distance measuring devices such as, for example, electronic shift registers or electromechanical arrangements such as the telephone selector switches.

A storage 20a, 20b and 20c, etc. is associated with each of counters 17a, 17b, 17c, etc. It is the function of each of these storage to store the correction singals signifying the correction value which is to be applied to the automatic exposure control means in the reproducing station for a corresponding original. Further shown in FIG. 1 is a correction means 22 which allow the operator to select one of seven correction values (including a zero correction value) for each original. The correction means has seven outputs, one of which is thus energized after the operator has made the selection. First connecting means connect the outputs of unit 22 to corresponding storage locations in each of storages 20a, 20b, etc. The first connecting means, 21 of FIG. 1, is shown in greater detail in FIG. 3 and operate to connect the outputs of unit 22 to the storage location which corresponds to the original viewed by the operator. The order is such that the storage corresponds to the original which is closest to the reproducing station and still has not received a correction value. As will be noted in more detail in connection with FIG. 3, the storage proceeds from one unit 20a to the next unit 20b, corresponding to originals in the opposite direction to arrow 3 and proceeds to a subsequent storage whether the correction value is a zero value or one of the other six correction values. Further, a key 22a forms part of the control means which key is depressed by the operator to signify that a particular original is not to be printed. This order can also be stored in the corresponding storage 20 so that the original, when it arrives at window 2, continues to be transported without, however, being first reproduced.

Indicator means, such as luminescent diodes 21a–21g are arranged along the entire length of the inspection station. Logic circuit means, shown as indicator control 23 in FIG. 1, serve to energize those indicators which are positioned next to the original whose corresponding storage 20 is connected to control means 22. As the original continues to be transported the count on counter 17 changes and indicator control 23 causes a corresponding change in which of indicators 21 are energized.

Further shown in FIG. 1 is an additional counter 24 which counts distance pulses furnished by transistor 10 when a signal is received simultaneously from scanning means 5a and 5b, thereby indicating a glued junction, that is a junction where two film strips have been glued together. When the count on counter 24 reaches a value indicating that the glued junction has reached the reproducing station, the motor control circuit receives a signal indicating that the transport is to continue without initiation of a printing process.

Figure 2:
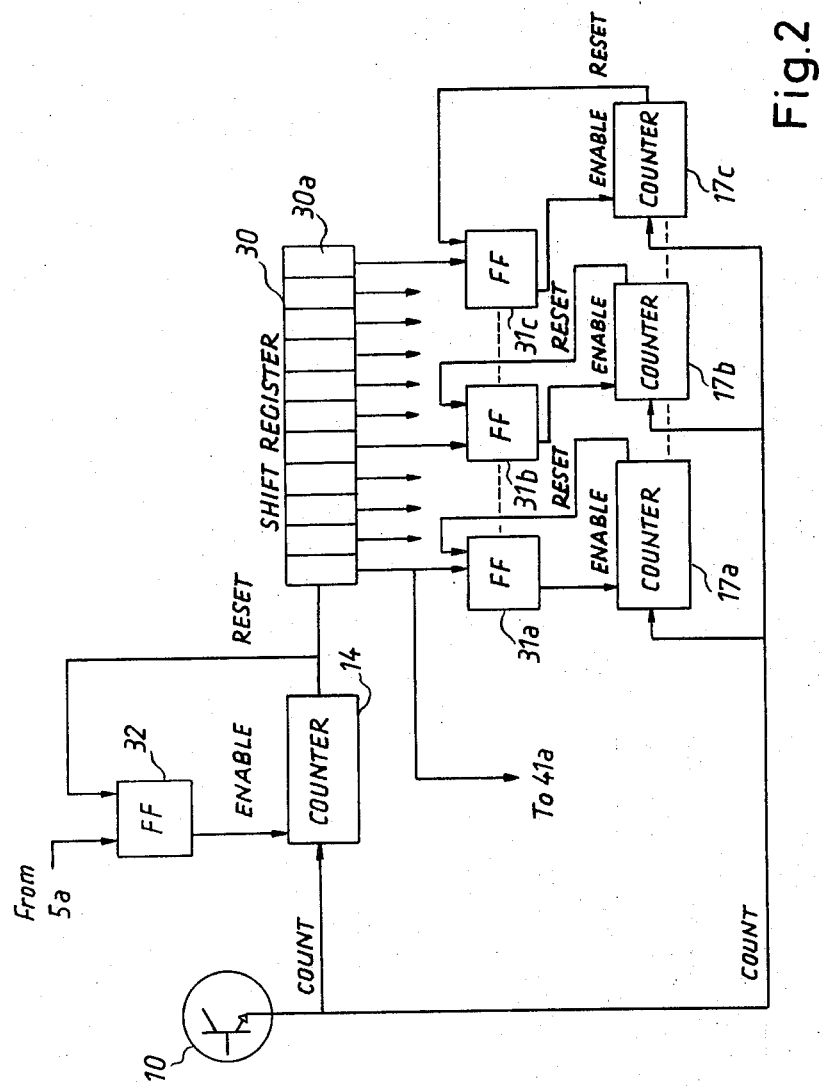
FIG. 2 is a schematic diagram showing the distributor means of FIG. 1.

The above-described arrangement operates as follows:

When the first mark 1b indicating the presence of the first original 1a passes scanning means 5a, counter 14 which was previously disabled and reset is enabled and starts to count the pulses furnished by transistor 10. The capacity of counter 14 can be adjusted by calibration of the distance from unit 5a to window 2. When counter 14 overflows it furnishes a signal which resets counter 14 and is also used via distributor 16 to start one of counters 17. The circuitry shown as box 16 in FIG. 1 is shown in more detail in FIG. 2. Thus a shift register 30 receives the overflow pulses from counter 14. These overflow pulses serve as shift register input pulses and are shifted in turn through each of the plurality of shift register stages 30a which constitute shift register 30. Although only three flip-flops 31a, 31b and 31c are shown in FIG. 2, in actuality each of the shift register stages 30a has an output connected to the set input of a corresponding flip-flop 31a, 31b, etc. Thus as each stage of the shift register is energized in turn, the corresponding flip-flop is switched to a set state. When the flip-flop is switched to a set state, it enables a corresponding counter 17a, 17b, etc. The counter then proceeds, as described above, to count the distance pulses furnished by transistor 10. It will be noted that each of the counters is disabled when it overflows, since the output of each counter is also connected to the reset input of the corresponding flip-flop. Also shown in FIG. 2 is a flip-flop 32 which is set upon receipt of a signal from scanning means 5a and reset under control of the shift register input pulse. When flip-flop 32 is in the set state counter 14 is enabled and counts the distance pulses furnished by transistor 10. When flip-flop 32 is reset, no counting takes place on counter 14.

Figure 3:
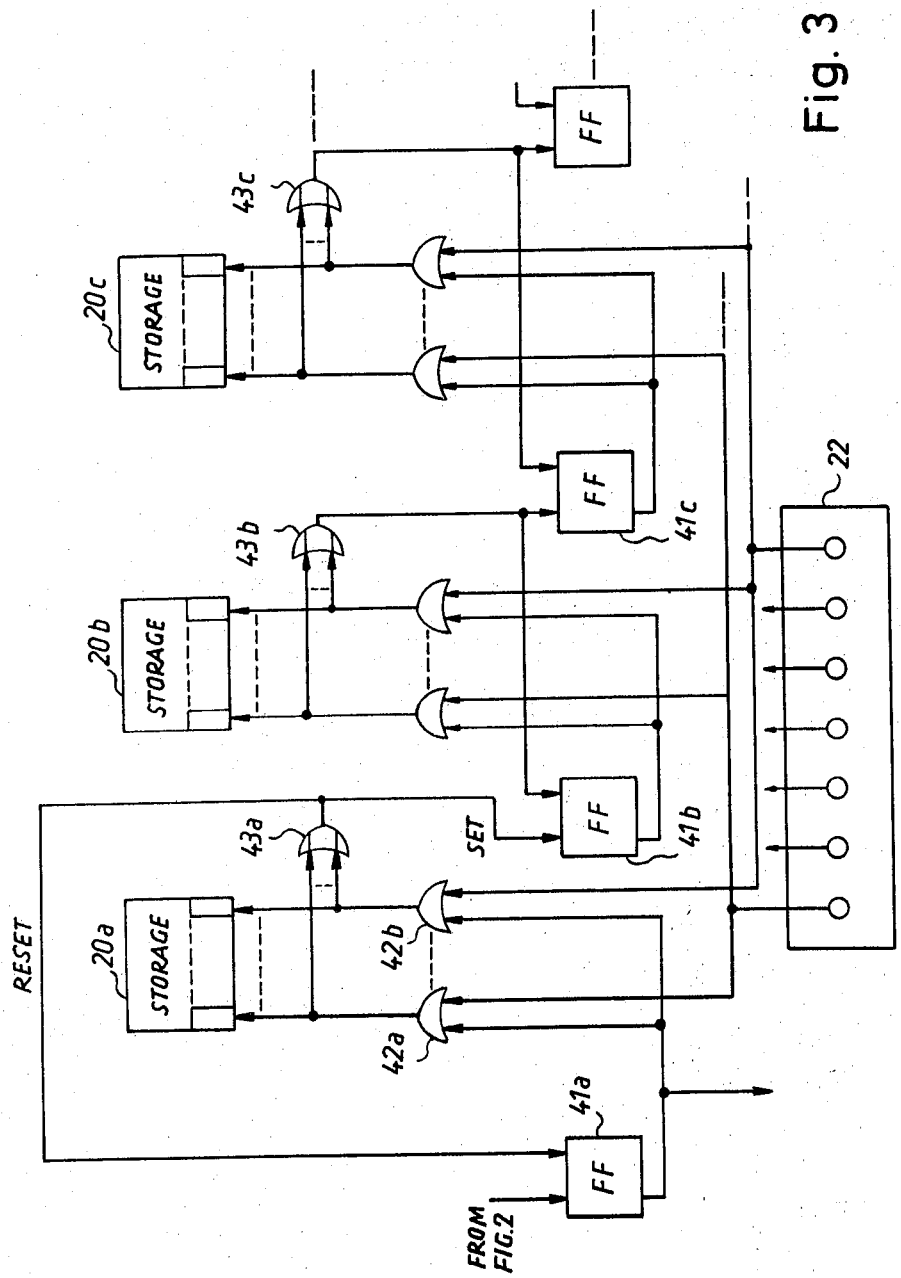
FIG. 3 is a more detailed diagram showing the first connecting means connecting the correction means in turn to each of the storage means shown in FIG. 1.

Thus it is seen that upon overflow of counter 14 the first of counters 17 is energized. As shown in FIG. 3, energization of a counter 17 takes place substantially simultaneously with the connection of one of storages 20 to the correction means 22. Specifically, as shown in FIG. 3, storage 20a has a plurality of storage locations marked 40a, 40b, etc. Storages 20b, 20c, etc. are constructed in the identical manner. Their storage locations are omitted for the sake of clarity. A flip-flop 41a has a set input connected to the output of stage 30a of shift register 30 and is thus set substantially simultaneously with flip-flop 31a. Flip-flop 41a, when in the set state, energizes the first inputs of a plurality of AND-gates whose second inputs are each connected to a different one of the outputs of control means 22. Specifically, only three AND-gates are shown, but of course seven AND-gates must be present, each having a second input connected to one of the outputs of control means 22. The output of each AND-gate is connected to a corresponding one of storage locations 40a, 40b, etc. When the operator selects a correction value, by, for example, depressing one of the quick return keys in unit 22, the corresponding storage location in storage 20a, is energized. Further, all the outputs of AND-gates 42 are connected to the inputs of an OR-gate 43 whose output in turn resets flip-flop 41a and sets a flip-flop 41b associated with the next subsequent storage. Activation of one of the correction keys in unit 22 by the operator then results in the storage of a corresponding value in storage 20b. It will be seen that the storage of correction values for sequential originals can take place as fast as they can be entered by the operator. This allows time to be saved for an original which is difficult to judge by entering the values for originals which are simple to judge as rapidly as is possible for the operator. The zero correction value of course also serves as an input to OR-gate 43 thereby also causing the activation of the AND-gates for the next subsequent storage means. Of course no correction value can be entered into any one storage means until the original is in the inspection station, that is until the counter corresponding to the particular storage 20 has been activated and has started to count. The count on the particular counter 17 then controls, via indicator control 23 shown in more detail in FIG. 4, which of indicators 21a–21g is to be lit.

Figure 4:
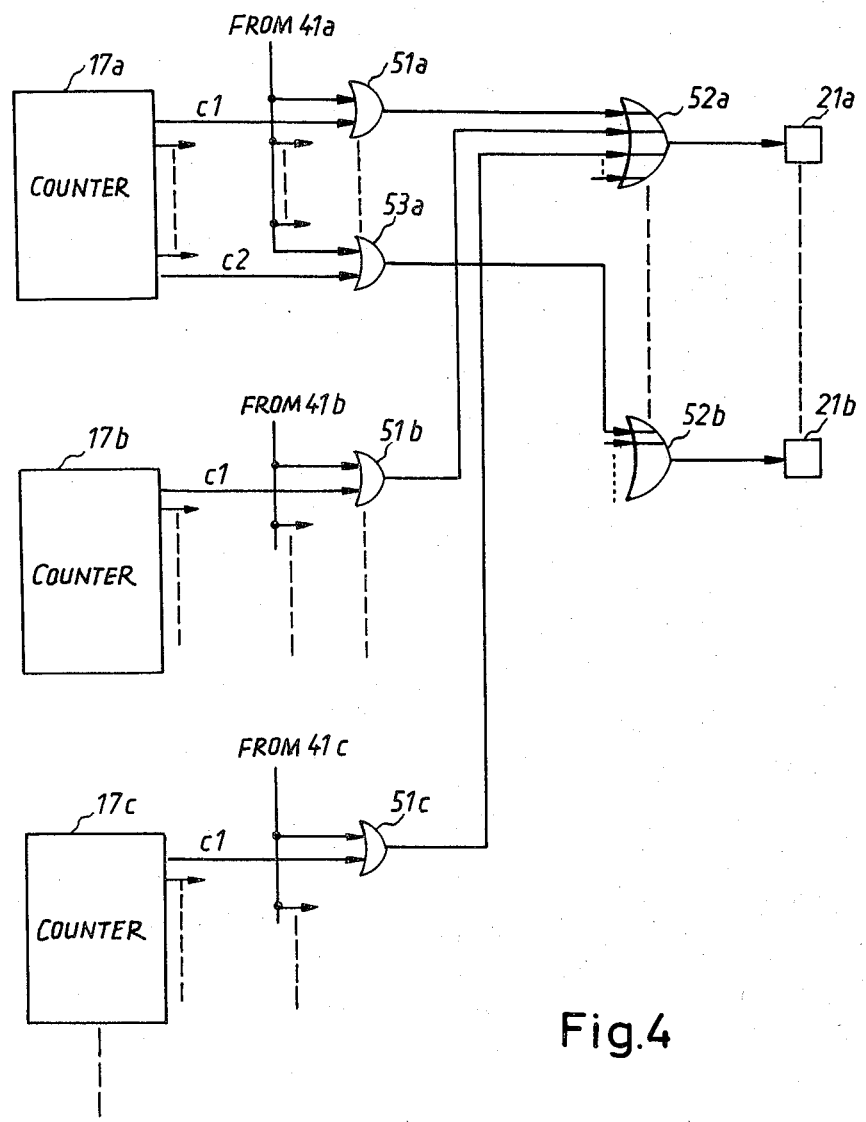
FIG. 4 shows the logic circuit means interconnecting the counters and luminescent diodes shown in FIG. 1.

FIG. 4 shows the three counters, used as an example, namely counter 17a, 17b and 17c. It further shows the indicator means 21a, 21b as an example, the further indicators not being shown. It is assumed here that the counters each have a plurality of counting outputs which, together, furnish the counting signal representing the count then on the counter. Alternatively, stages 17a, 17b and 17c may each comprise a shift register. In the latter case, a single output would indicate the count in the particular counter at any given time. For the first case line $C_1$ in FIG. 4 would indicate a plurality of lines, while in the latter case it would constitute, as actually shown, a single line. Line or lines $C_1$ are fed to a first input of an AND-gate 51a whose second input is energized when a signal appears on line 41a'. A signal appears on this line whenever flip-flop 41a of FIG. 3 is in the SET state. The output of AND-gate 51a, which of course occurs upon simultaneous presence of a signal at both inputs, is applied to one input of an OR-gate 52a whose output in turn is used to energize indicator means 21a, that is, for example, to connect a luminescent diode 21a to a current source.

Similarly the output line $C_1$ of counter 17b which signifies the same count as the count on line $C_1$ of counter 17a, is connected to an AND-gate 51b to whose other input is connected the signal on line 41b'. The latter signal of course appears when flip-flop 41b of FIG. 3 is in the set state. The output of AND-gate 51b is also applied to an input of OR-gate 52, thereby causing luminescent diode 21a to be energized when the original whose storage 20 is connected to control means 22 is in a position physically located next to luminescent diode 21a. Again, line $C_1$ at the output of counter 17c is connected to a similar AND-gate 51c whose other output is energized by a line 41c', just as stated in connection with AND-gates 51b and 51a mentioned above. The outputs of all similar AND-gates from the remaining counters 17 are similarly connected to the inputs of OR-gate 52. Thus luminescent diode 21a will light whenever the original which corresponds to the storage then connected to the output of control means 22 is adjacent to luminescent diode 21a. 21a may of course represent a group of diodes rather than a single diode.

Similarly, the counting output $C_2$ of counter 17a is connected to an AND-gate 53a whose second input is also connected to line 41a' and whose output is connected to one input of an OR-gate 52b whose output in turn energizes a luminescent diode or diodes 21b. The remaining inputs of OR-gate 52b are energized from corresponding AND-gates of the remaining counter 17c similarly as described in relation to OR-gate 52a. It will be noted that use of the circuit of FIG. 4 causes, in every case, those luminescent diodes to light which are opposite the original into whose storage the correction value is to be entered at that time. This gives the operator a chance to examine the relevant original and then enter the correct correction values into the relevant storage.

The above-described storage of the correction values and the lighting of the corresponding indicator lamps occur while the transport means are moving the film along the predetermined path. When one of the counters 17, for example counter 17a reaches a count signifying that the corresponding original has arrived at window 2 (zero distance count) a signal is furnished to one input of OR-gate 18 which in turn causes the motor control circuit 19 to stop motor 11. The same signal is further used to reset flip-flop 31a (FIG. 2), thereby causing counter 17a to stop counting. Further, the zero distance signal is used to permit the transfer of the value stored in storage 20a to the automatic exposure control system and the printing process is initiated. After the automatically controlled end of the printing process motor 11 is restarted and continues to transport the film until counter 17b again causes it to stop. The only time motor 11 is not stopped is in response to the pressing of key 22a or because a signal from counter 24 indicates that a glued junction has been encountered.

As previously mentioned, the correction values can be stored by the operator in the present system so rapidly, that the overall speed of the arrangement is limited only by the time required to carry out the printing process itself. The main advantage of the arrangement of the present invention is that the operator can enter the correction values required for substantially correctly exposed originals very rapidly and therefore save time which may be required to give more difficult negatives a more thorough examination. of course it must be kept in mind that the number of badly exposed originals in a roll is generally substantially less than the number of correctly exposed originals. Thus the efficiency of the system is greatly increased without in any way reducing the quality of the resulting product.

A further increase in reliability can be achieved by adding a circuit to the indicator control means 23 which causes the motor to stop if the indicator means positioned immediately next to the reproducing station is energized. Energization of this indicator means would of course show that the correction value for the original immediately in front of the reproducing station has not as yet been entered into the corresponding storage. Thus the stopping of the motor would allow the operator to enter the correction value prior to the time that the original is actually positioned relative to window 2.

While the invention has been illustrated and described using a particular embodiment for the counters, storages, and connecting and logic circuit means required to effect the proper operation, it is not intended to be limited to the details shown, since various modifications and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for furnishing photographic copies of originals positioned in sequence along a roll of photographic film, comprising, in combination, transport means for transporting said originals along a predetermined path; a reproducing station positioned along said predetermined path for reproducing an original located in a predetermined position within said reproducing station; automatic exposure control means at said reproducing station for controlling the exposure of said original in correspondence to a correction signal applied to said exposure control means; an inspection station located prior to said reproducing station along said predetermined path, for inspection of a plurality of said originals; a plurality of means at least equal in number of said plurality of originals in said inspection station for furnishing distance signals each signifying the distance of a corresponding one of said plurality of originals in said inspection station from said predetermined position in said reproducing station and for furnishing a zero distance signal when the corresponding one of said originals is at said predetermined position; means for stopping said transport means in response to any one of said zero distance signals; a plurality of control storage means each associated with one of said means for furnishing a distance signal, each having an input for receiving a correction signal and an output for furnishing said correction signal; first connecting means for connecting each of said inputs of said storage means to said correction means in a first predetermined order, each only after furnishing of a correction signal to the last preceding one of said inputs in said first predetermined order; indicator means for indicating which of said originals in said inspection station corresponds to the storage means having an input connected to said correction means; and second connecting means for connecting the output of each of said storage means to said automatic exposure control means when the associated means for furnishing a distant signal furnish said zero distance signal.

2. Equipment as set forth in claim 1, wherein said first predetermined order starts with the one of said originals closest to said predetermined position in said reproducing station.

3. Equipment as set forth in claim 1, wherein said film has a plurality of marks, each positioned in a predetermined location relative to one of said originals; further comprising sensing means positioned immediately prior to said inspection station along said predetermined path, for sensing said marks and furnishing a mark signal in response to each of said marks; and pulse generator means coupled to said transport means for furnishing a distance pulse for each predetermined unit distance travelled by said film along said predetermined path; and wherein said means for furnishing distance signals comprises a plurality of counters, each enabled in response to one of said marks, each for counting said distance pulses and furnishing said zero distance signal when the count on said counter corresponds to the distance between said sensing means and said predetermined position in said reproducing station; further comprising means for resetting each of said counters in response to the zero distance signal furnished by said counter.

4. Equipment as set forth in claim 3, further comprising distributor means for enabling each of said counters in a second predetermined order corresponding to said first predetermined order.

5. Equipment as set forth in claim 4, wherein said distributor means comprise shift register means having a plurality of shift register stages, for furnishing a shift register output signal in turn in each of said shift register stages upon receipt of a shift register input signal; further comprising initial counting means interconnected between said sensing means and said shift register means, for counting said distance pulses following receipt of one of said mark signals and furnishing said shift register input signal upon receipt of a predetermined number of said distance pulses; and wherein said distributor means further comprise a plurality of flip-flops, each connected to one of said counters and one of said shift register states, each of said flip-flops having a set state enabling the corresponding counter in response to a shift register output signal, and a reset state disabling said corresponding counter in response to said zero distance signal from said counter.

6. Equipment as set forth in claim 3, wherein said pulse generator means comprise disk means mounted for rotation with said transport means, said disk means having a plurality of openings; and photoelectric transmitter and receiver means positioned relative to said openings in such a manner that passage of an opening between said transmitter and receiver means generates said distance pulse.

7. Equipment as set forth in claim 5, wherein each of said storage means has a plurality of storage locations, each for furnishing a corresponding correction signal when energized; and wherein said correction means comprise a plurality of correction outputs equal in number to said number of storage locations in each of said storage means, and adapted for selective energization under operator control.

8. Equipment as set forth in claim 7, wherein said first connecting means comprise a plurality of groups of AND-gate means, each of said groups of AND-gate means being associated with one of said storage means, each of said groups having a plurality of AND-gate means corresponding in number to the plurality of storage locations in the associated one of said storage means, each of said AND-gate means having a first input connected to a corresponding one of said correction outputs, a second input for receiving a gating signal, and an output connected to a corresponding one of said storage locations in the associated one of said storage means; further comprising means for furnishing said gating signals in said first predetermined order to each of said groups of AND-gate means.

9. Equipment as set forth in claim 8, wherein said means for furnishing said gating signals comprise a plurality of flip-flop means, each associated with one of said storage means, each of said flip-flops having a set state furnishing said gating signal upon receipt of a signal at the output of one of said AND-gate means of the preceding one of said storage means in said first predetermined order and a reset state in response to a set state of a flip-flop associated with the next subsequent one of said storage means in said first predetermined order.

10. Equipment as set forth in claim 9, wherein said indicator means comprise luminescent diodes.

11. Equipment as set forth in claim 10, further comprising logic circuit means interconnected between each of said counters and said luminescent diodes in such a manner that energization of said luminescent diodes depends on the count on the counter corresponding to the one of said storage means gated by said gating signal.

12. Equipment as set forth in claim 11, wherein said luminescent diodes are positioned along said predetermined path in the direction of motion of said film; wherein said luminescent diodes comprise a last luminescent diode positioned closer to said predetermined position within said reproducing station than the remainder of said luminescent diodes; and wherein said means for stopping said transport means further comprise means for stopping said transport means while said last luminescent diode is energized.

* * * * *